United States Patent [19]

Robertson et al.

[11] 4,299,010
[45] Nov. 10, 1981

[54] ANIMAL PELTING SYSTEM

[75] Inventors: Angus A. J. Robertson, Rangiora; Carey J. France, Masterton; Colin A. Roberts, Hamilton, all of New Zealand

[73] Assignee: A. J. Park & Son, Wellington, New Zealand

[21] Appl. No.: 129,823

[22] Filed: Mar. 12, 1980

[30] Foreign Application Priority Data

Mar. 29, 1979 [NZ] New Zealand ................. 190042

[51] Int. Cl.³ .............................................. A22B 5/16
[52] U.S. Cl. .......................................... 17/50; 17/21
[58] Field of Search ....................................... 17/21, 50

[56] References Cited

U.S. PATENT DOCUMENTS

3,683,455  8/1972  Anderson ............................. 17/50
4,099,294  7/1978  Taber ................................ 17/21 X
4,127,917 12/1978  Pohio et al. ........................... 17/21

Primary Examiner—Willie G. Abercrombie
Attorney, Agent, or Firm—Cushman, Darby & Cushman

[57] ABSTRACT

A system of removing the pelt or skin from a carcass of an animal and in particular a sheep which involves working up the carcass so that the skin is removable substantially as an envelope from trunk regions, clamping the worked up pelt and inserting a trunk encircling device between the clamped worked up pelt and the trunk of the carcass thereby clearing the skin therefrom and clearing the rear legs of the animal by causing movement of the carcass relative to the inserted device which results in the rear legs of the carcass being pulled up within the skin envelope to thus clear the skin from the rear legs.

20 Claims, 26 Drawing Figures

ANIMAL PELTING SYSTEM

BACKGROUND OF THE INVENTION

1. Field of the Invention

The present invention has application in the field of animal slaughtering and dressing in that it provides a hygenic but effective method of skinning or pelting an animal which results in a carcass of good surface condition, the method involving means which combines with a conveyor supported animal to thus allow a fast throughput.

2. Description of the Prior Art

Many methods of pelting of animals such as sheep, beef stock, pigs, goats and the like are known. More recently however with the high hygenic demand coupled with the economic need for speed there has been some considerable development especially in connected with the pelting of sheep into apparatus capable of being incorporated on the normal abattoir conveyor chain so as to not only efficiently skin the animals but also to have the same skinned in a condition that not only leaves the carcass hygenic and marketable but which also ensures that the carcass or cuts subsequently taken therefrom meet the stringent European or United States hygiene requirements while in no way making the pelt that has been removed therefrom unusable. In regard to methods and apparatus various mechanisms have been designed for example, that disclosed in New Zealand Patent specification No. 175739 which utilises a ring or the like clamp which holds a rump flap or the like of the pelt of a sheep so as to expose the inside outwards and which enables the animal to be withdrawn therefrom. Such a system while going someway to meeting the above mentioned requirements does not provide speed and an aesthetic and fully hygenic carcass. This is primarily because of the amount of working up required prior to the employment of the machine assist sequences. In New Zealand Patent Specification No. 181447 there is disclosed a system whereby a foreleg hung carcass has its nose regions engaged with a rotating small diameter roller which tends to roll down the neck and along the back bone of the animal taking the worked up pelt with it. With such a system a certain amount of working up in addition to the standard Y-cut is necessitated and while that form of apparatus goes a considerable way to meet the above mentioned desiderata alternative methods should be developed so as to forestall the more stringent requirements likely to be encountered from time to time in order to reduce imports of meat products into countries of the EEC or the United States.

It is therefore an object of the present invention to provide means and/or methods which will go at least some way to meet the above mentioned desiderata or which will at least provide the public with a useful choice.

BRIEF SUMMARY OF THE INVENTION

In one aspect the present invention consists in a method of removing the pelt or skin from a carcass of an animal such as a sheep, a cattle beast, a goat, a pig or the like which comprises the steps of: working up the carcass so that the skin or pelt is removable substantially as an envelope from regions extending substantially from brisket regions to rump regions of the carcass, clamping with clamping means portions of the worked up skin or pelt about the trunk of the animal at about the level of the brisket region so as to hold the worked up regions of the skin or pelt away from the carcass with the inside of the skin or pelt exposed substantially in a trunk encircling manner, freeing the skin or pelt from the carcass over its trunk from the brisket region to the rump region by causing a mechanical device to be inserted between the skin or pelt and the carcass substantially to about the rump level of the trunk, the said device substantially encircling the trunk of the carcass during such insertion, holding said mechanical device at a position between the skin or pelt and the carcass at the region of the trunk thereof of which the rump substantially forms part and causing a relative movement between (i) the carcass and (ii) the skin or pelt, the clamping means and said mechanical device so as to withdraw substantially all, if not all, of the rear legs of the animal from the skin or pelt.

Preferably said mechanical device is substantially in the form of a ring.

Preferably said mechanical device is formed from a first portion and from a second portion, said first and second portions being brought together to substantially encircle fore regions of the trunk of said carcass prior to relative movement with respect to the animal to remove the pelt or skin from the trunk regions thereof during said insertion step.

Preferably said mechanical device includes means at or about the region thereof that is passed over the belly of the carcass adapted to minimise a build up of belly in front thereof as the mechanical device acts to remove belly regions of the skin or pelt from the carcass during said insertion step, said method including the additional step of using said means to prevent such build up during said insertion step.

Preferably said mechanical device is halted at or just to the fore side of the level of the rump region of the trunk of the animal and means forming part of said mechanical device is actuated to continue such relative movement between the skin or pelt and the carcass over the rump region of the animal but not substantially over or between those regions of the rear legs closest to the belly of the carcass.

Preferably said clamping is achieved by providing clamping means defining a ring about the outside of the pelt or skin to be clamped, said ring substantially encircling the trunk of said animal and clamping over the inside of the pelt that has been turned out over said first mentioned ring.

Preferably said clamping over said first mentioned ring is by a second ring like member.

Preferably at least one clamping ring comprises at least two arcuate members capable of being brought substantially into engagement with the carcass and thence by relative movement between said arcuate members of conforming substantially to a ring like configuration.

Preferably there are three arcuate portions to define a ring, the central of the three being an arcuate portion that is positioned around the back of the animal.

Preferably said mechanical device during the course of its insertion between the skin or pelt and the carcass acts substantially solely on the skin and not on the carcass during the skin or pelt removal pulling operation to thus provide a substantially perpendicular pull from the surface of the carcass of its skin or pelt over the region of the carcass from the brisket region to the rump level.

Preferably said carcass is foreleg hung from said conveyor and the rear legs of the animal are not supported directly from the conveyor.

In a further aspect the present invention consists in apparatus suitable for performing the method in this respect the present invention therefore also consists in apparatus disposed relative to a conveyor capable of conveying a slaughtered animal such as a sheep, cattle beast, goat, pig or the like when in a worked up condition so that the skin or pelt is removable substantially as an envelope from regions extending substantially from brisket regions to rump regions of the carcass comprising clamping means capable of holding worked up skin or pelt about the trunk of a conveyor supported animal at about the level of the brisket region so as to hold the worked up regions of the skin or pelt away from the carcass, means capable of being brought to substantially encircle the trunk of said carcass and insertible between said skin or pelt when the same is clamped by said clamping means down to and around the carcass substantially to that level of the trunk of which the rump substantially forms part, means to provide the required relative movement between said insertible means and a carcass held on said conveyor, means to hold said insertible means about the trunk of an animal at that level of which the rump substantially forms part and means for causing a relative movement between (i) the carcass and (ii) said skin or pelt, clamping means and said insertible means so as to enable the carcass to be withdrawn substantially completely from said skin or pelt with the rear legs or remainder thereof of the animal being pulled from the skin or pelt up through the envelope thereof.

BRIEF DESCRIPTION OF THE DRAWINGS

The preferred form of the present invention will now be described with reference to the accompanying drawings in which.

A person skilled in the art will recognise the desirability of removing the skin in a manner such that the correct angles are obtained in order to minimise damage to the underlying tissue, i.e. so as to leave the fell as far as possible on the carcass. In this regard reference should be made to New Zealand Patent Specification No. 181447 where reference is made to preferred directions of pull on skins in order to achieve fell retention. A person skilled in the art will also recognise the difficulty of removing skin in a manner which does not require human intervention either by way of (a) hand, (as is frequently the case with sheep and lambs), or (b) knife, (as is frequently the case with beef animals). In order to minimise the damage to underlying tissue also it would be recognised that there is a desirability of having some device to immitate the hand or knife but without consequent hygiene difficulties associated therewith. Of course persons skilled in the art will recognise the difficulty of grasping and pulling skin in such a manner as to prevent damage to the skin yet enabling the skin to be pulled without an excessive number of opening cuts so as to reduce to a minimum the chances of dust, hair, wool, dirt etc reaching the surface of the carcass. All throughout such a pelting system a person skilled in the art will appreciate the need to ensure that those regions of the pelt or skin pulled from the animal should not be allowed to reencounter the carcass. This is achieved by the method of the present invention owing to the fact that the ring of the mechanical device holds the pelt over the trunk regions well away from the carcass and even when the carcass is being moved relative to the pelt in order to clear the rear legs thereof the tension kept on the rear legs by the skin as it is being pulled therefrom tends to centre the carcass against any tendency to swing into a non-hygenic contact with the skin that has already been cleared.

The development of the present invention enables with the apparatus as shown in the accompanying drawings consistent results over the brisket and flank of the animal and over the back as far as the butt but some inconsistencies are occuring in the final pull of the hind legs. Opening up over the fore quarter is similar to traditional methods while every endeavour is being made to minimise the amount of opening up over the hind quarter. Clearing over the anus and tail is being carried out at present while work to date shows that there should be no need to mark the hind legs or clear over either udders or cods. The working up therefore of the fore quarter is such as to provide the standard Y-cut and the clearing of the brisket and shoulders, the brisket being cleared only so far as shown in the accompanying drawings. Areas that require further consideration at this stage is the consideration of whether or not it is best to leave on the hind trotters or to remove them. Similarly consideration will have to be given in due course whether it is best to remove the head or the leave the head on during the pelting operation. If the head is removed then obviously the head movement throughout the chain will have to be synchronised with the carcass in order to meet overseas health requirements.

Figure 6:
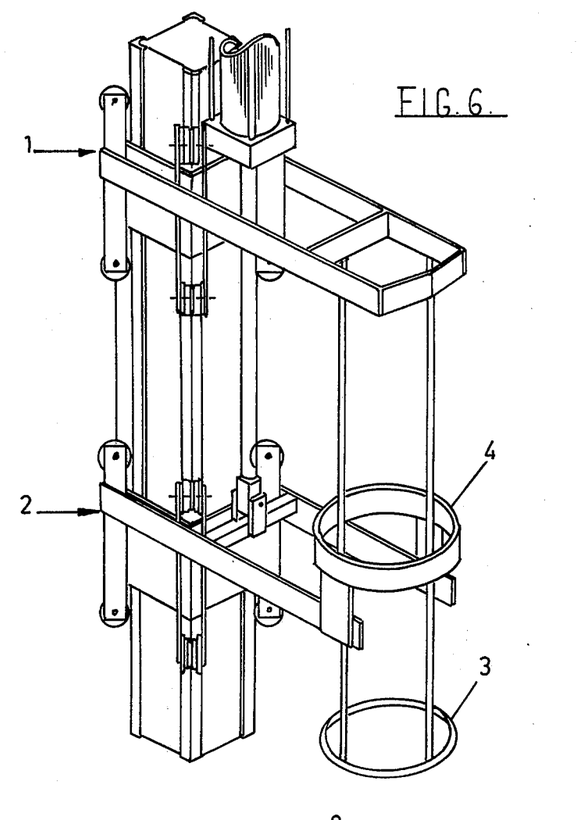
FIG. 6 shows a form of apparatus in accordance with the present invention which by virtue of a pair of carriages provides means which enables the required relative movements to be achieved between the clamping ring and the ring of the mechanical device.

Turning to the drawings therefore it can be seen that the apparatus as shown in FIG. 6 includes a vertical post on which two carriages 1 and 2 are adapted to be moved vertically. Carriage 1 includes supported downwardly therefrom a simplified insertable device 3 of the mechanical device. The other carriage 2 includes suspended therefrom a simplified clamping ring or the like 4. The fine mechanical detail of the device is not necessary for persons skilled in the art to appreciate that various hydraulic systems can ideally be coupled with each carriage so as to control the degree and extent of movement and inter-relationships between the members 3 and 4. While the simple ring as shown works perfectly well in time it may be appropriate to provide a ring which is deeper in section or which does not lie in a plane as does the ring shown. Moreover it should be realised that FIG. 6 which has been included simply to show the dual carriage concept does not show any members capable of clamping onto the outside of the ring 4 (itself not segmented for simplicity) in order to provide the clamping arrangement as required. This form of additional clamping can best be considered with reference to the other drawings and in particular FIGS. 1, 8, 19, 20, 21, 22 and 23 where the ring 4 can be seen to be under the worked up regions of the pelt while the declamping ring or the like 5 clamps thereover.

Figure 1:
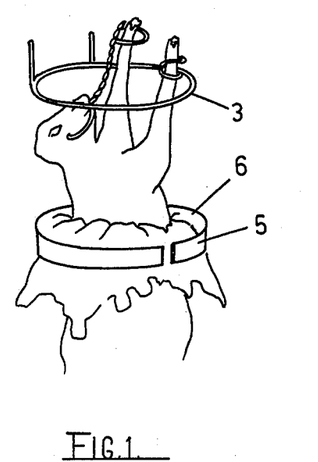
FIG. 1 shows a foreleg supported worked up sheep carcass which has the encirling ring of the mechanical device positioned therearound ready for lowering so as to act upon that region of the skin which is inside upwards that skirts the brisket level of the trunk of the carcass and is held in a substantially encircling clamp.
Figure 3:
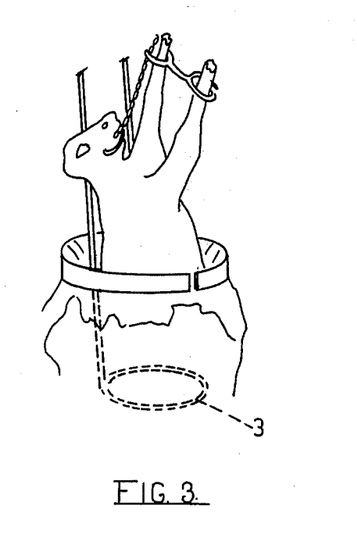
FIG. 3 is a similar view to that of FIGS. 1 and 2 but showing the ring of the mechanical device in dotted outline at its lower most extremity of its movement during which time through perpendicular or normal pulling of the pelt or skin it removes the pelt from about the trunk regions of the carcass from the brisket level to the rump level.
Figure 4:
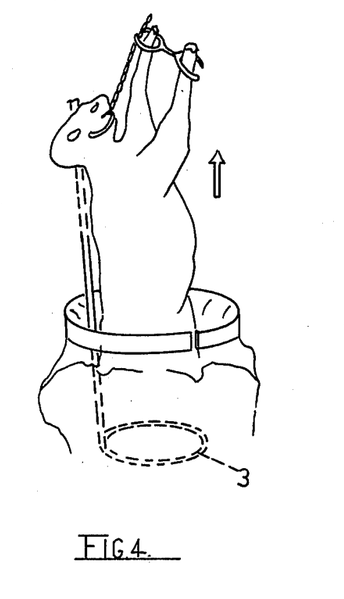
FIG. 4 is a similar view to that of FIG. 3 but showing by the direction of the arrow the direction in which the carcass by virtue of its support by the gambrels on which its forelegs are held can be moved in order to remove the rear legs of the carcass from the leg regions of the pelt, the leg regions in a minimal working up method preferably being left as socks.
Figure 5:
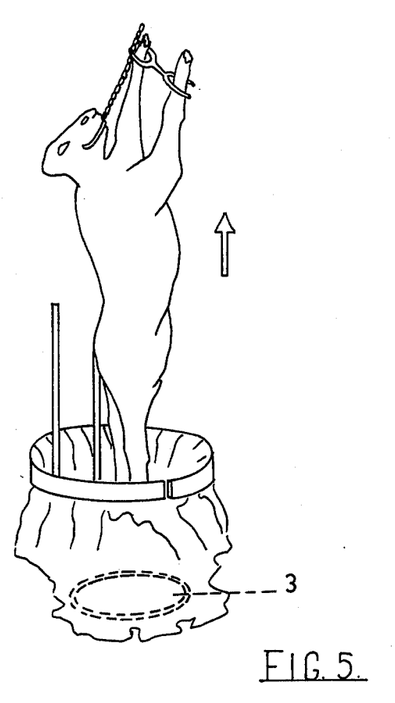
FIG. 5 shows the virtually complete removal of the carcass from the pelt, the ring holding the trunk regions of the pelt or skin against being pulled inside out, but not of course stopping the rear leg regions of the pelt from being pulled inside out within the confines of the trunk regions of the pelt.
Figure 7:
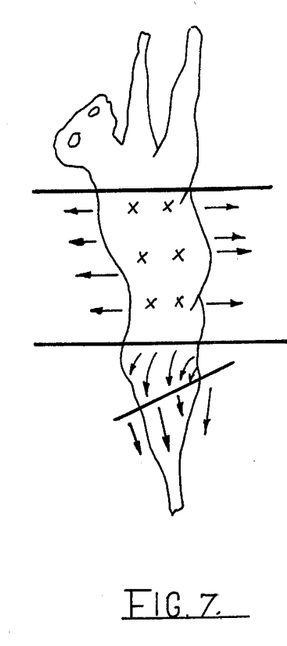
FIG. 7 is a view of a foreleg suspended sheeps carcass showing over three zones from the brisket level of the carcass down the various directions of pull that are achieved by the method using apparatus of FIGS. 1 to 6 and which are considered desirable at least for the trunk of the carcass in order to achieve the best retention of the fell on the carcass, the directions of pull being substantially normal in the main trunk zone, being circulatory towards the anus about the rump regions and upper thigh regions and being along the shank of the leg at lower thigh regions thereof.
Figure 8:
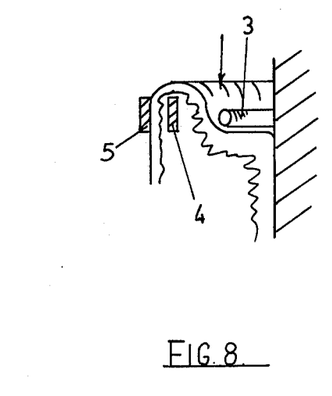
FIG. 8 is a diagrammatic view showing in section a form of clamp which clamps the worked up regions of the pelt so as to expose the inner surface of the pelt upwards so that the ring of the mechanical device when moved in the direction of the arrow acts on the pelt so as to provide the right angled pull.
Figure 9:
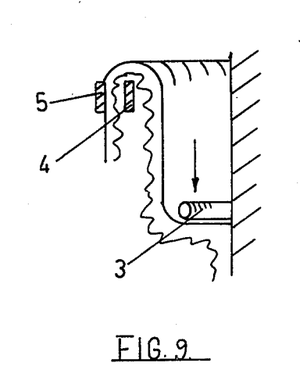
FIG. 9 is a similar view to that of FIG. 8 showing how over trunk regions the ring when moved in the direction of the arrow still manages to achieve the required perpendicular pull as shown by arrows in FIG. 7.

Turning to FIG. 1 it can be seen that the ring of the mechanical device 3 bears down on those regions 6 of the worked up pelt which is pulled reasonably taut between the carcass and the substantially encircling clamping effect of the members 4 and 5, thus enabling upon the downward movement of the ring 3 the pressing thereof so as to cause the perpendicular pull that is evident from a perusal of FIGS. 7 to 9 over at least the trunk regions thereof. As can be seen the ring 3 continues down to the condition as shown in FIGS. 3 and 4 at which stage a pull is made on the carcass so as to pull the carcass upwardly between the encircling members 4 and 3 and clear of those regions of the pelt already removed therefrom while at the same time the rear legs of the carcass are pulled clear of the rear leg regions of the pelt which pull upwardly inside of the ring 3 when the carcass is almost pulled clear as shown in FIG. 5. For ease of this pulling ideally the rear leg trotters are removed although this is not necessary.

In the form of the invention as shown the fore legs of the carcass are held by an appropriate gambrel. Any form of support would be appropriate. Moreover as also shown in the drawings the head of the carcass is stabilised by a hook that hooks into the head and which applies tension thereto to hold the same substantially towards the forelegs so as to allow the ring 3 to clear the head.

Figure 2:
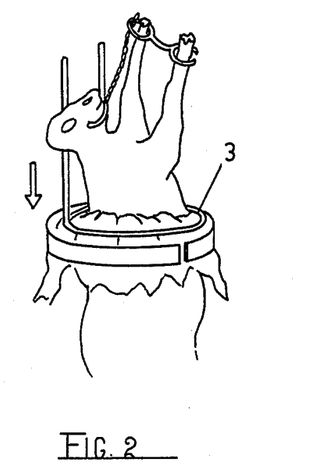
FIG. 2 is a similar view to that of FIG. 1 but showing the ring or the like of the mechanical device being lowered so as to act on the pelt so as to provide a substantially perpendicular pull from the trunk of the carcass.

Persons skilled in the art will appreciate that for high speed operation means will ideally be provided to enable the ring 3 to be positioned in an encircling manner about the carcass without it being necessary to go to the difficulty of man handling a carcass etc. Possibly in this regard the ring 3 may be a composite member for example, two halves which swing together about those regions of the carcass on which it is to act, i.e. the ring 3 could clamp together or be assembled under the action of various mechanical means e.g. rams or the like acting on supports of the ring so that it assumes its position as required over its operative range which commences at the condition as shown in FIG. 2 and ceases when the carcass has been pulled clear as in FIG. 5.

Similarly persons skilled in the art will appreciate how the clamping arrangement can be appropriately modified. It should be realised that various means could be provided in order to stabilise the worked up regions of the pelt. In this regard a strict clamp need not be necessary, in some forms it may be appropriate to provide hooks, spikes, grips or the like. However a person skilled in the art will appreciate such variations which can be achieved but which still fall within the general scope of the present invention.

Figure 10:
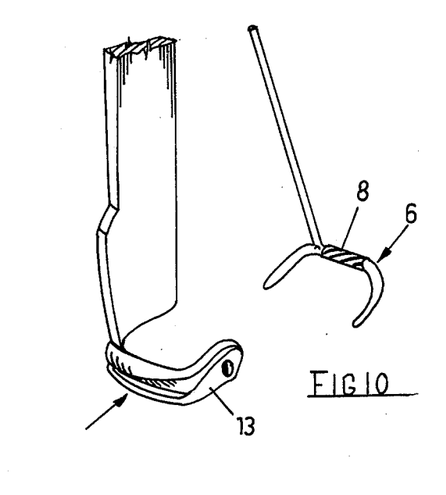
FIG. 10 shows a preferred form of the insertible device of the present invention which includes means which allows two ring segments to be pivotted together to a substantially constant condition for insertion between the skin or pelt and the trunk regions of the animal.
Figure 11:
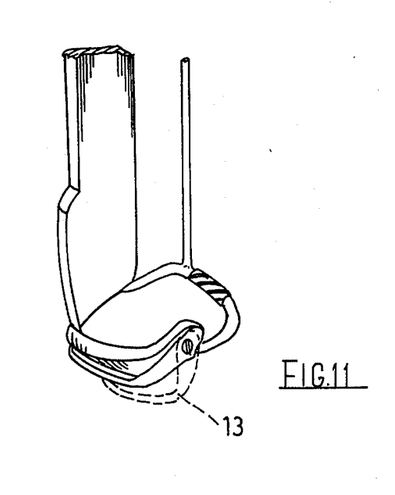
FIG. 11 is the apparatus of FIG. 10 shown in its pivotted together substantially constant relationship where it defines a ring, the dotted line showing means capable of being actuated when said ring encircles the trunk of a carcass at the level of which the rump substantially forms part of being actuated to pass down and substantially around the rump of the animal but with substantially no corresponding movement on the belly side of the animal.
Figure 12:
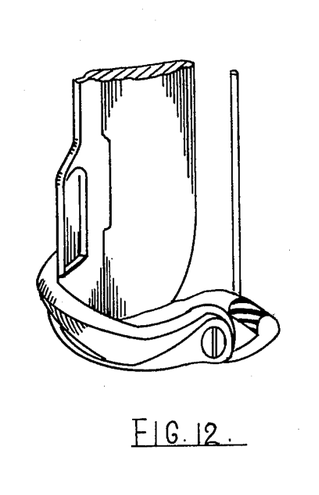
FIG. 12 is a more detailed view of the ring of the embodiment shown in FIGS. 10 and 11 showing how it is possible for a carcass to be conveyor supported, preferably by its fore legs and to approach the ring when in its FIG. 10 condition yet have the same enclosed therearound without any undue interference between the pivotting means and the carcass, FIG. 12 also showing for the region of the composite ring which will pass down over the belly of the animal in axially rotatable and preferably oscillatory means adapted to ensure there is no build up of belly fat in advance of the ring as the same is being inserted.
Figure 13A:
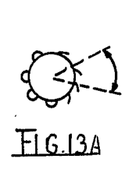
FIGS. 13(a) to 13(d) show diagramatically a profile of such an oscillatory means as shown in FIGS. 10 to 12 with the arc of the oscillatory rotational motion being denoted in FIG. 13(a) by the angle alpha, it being seen therefore how the kneading protruberances to the left of each profile acts substantially in the manner of knuckles to clear the pelt and with the arcuate edges to the right tend to trim fat, if any caught on the pelt as it is removed.
Figure 13B:
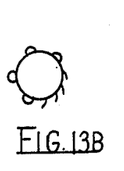
Figure 13C:
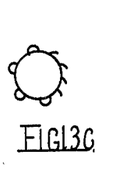
Figure 13D:
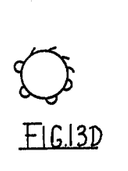
Figure 14:
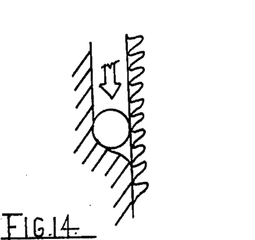
FIG. 14 shows diagrammatically a portion of a ring passing between the belly of a carcass (to the left) and the belly skin showing how a ring can result in a certain build up of belly fat in advance of the ring, the direction of advance being denoted by the arrow.
Figure 15:
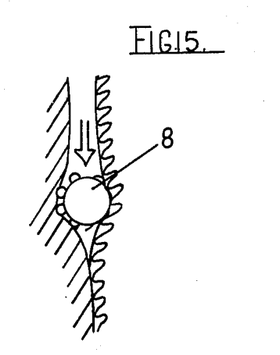
FIG. 15 shows how the oscillatory arrangement as described with reference to FIGS. 10 to 13(d) minimises any such fat build up, FIG. 15 being substantially identical to FIG. 14 save for the use of the profiled belly portion of the ring.

Preferred forms of the insertion device and the clamping means are as described in FIGS. 10 through to 23. FIGS. 10, 11 and 12 show two pivotally associatable ring segments capable of being brought to the condition as shown in FIGS. 11 or 12 where the same form a substantially ring like member capable of being forced down between the clamped pelt or skin and the carcass of the animal. It is to be seen that each segment is supported by means which is disposed to one side so that no difficulties are encountered in encompassing the trunk of an animal being brought by way of example to the apparatus as shown in FIG. 10 from the right by a horizontal conveyor. The apparatus, however, as shown in FIGS. 10 to 12 include a frontal ring segment 6 and a rear ring segment 7. The frontal segment including a belly contacting portion 8, the action of which is determinable by reference to FIGS. 13(a) to 13(d) which shows the oscillatory movement of the same with the knuckle portions (see FIG. 15) disposed towards the carcass belly but with the other portion oscillating by for example angle alpha against the skin thereby ensuring a lifting up of fat as the ring is inserted over the belly of the animal rather than a bulging and building up of fat in advance of the insertion device as shown diagramatically in FIG. 14. Persons skilled in the art will appreciate how for example spiral helical knuckles or edges could be employed, see FIGS. 10 to 12 in order to derive the best advantage.

Figure 16:
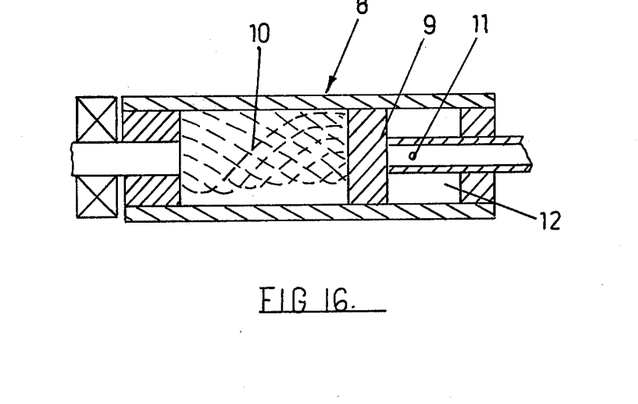
FIG. 16 is a sectional view of the belly portion of such a ring, the section not showing the form of the protuberances of the profile but showing how pneumatic means can provide for the rotatable region, the required oscillatory movement about the angle alpha by the injection and withdrawal of air from the expansion chamber disposed between a piston and the right hand end of the member, the resulting movement of the piston being such as to compact or allow the expansion of a spiral or helical flexible skeletal member which is fixed to the rotatable element to thereby convert reciprocal movement of the piston into oscillatory rotational movement, of the rotatable region.

FIG. 16 shows a sectional view of a method of oscillation of the tubular member 8 by means of an axially slidable piston member 9 disposed therein which compresses or allows to expand a spiral flexible skeletal member 10 which when compressed and allowed to expand will rotate first in one direction and then in the other direction the member 8. The movement of the piston 9 would be by virtue of a ducting of air through a port or the like 11 into the expansion chamber 12. Persons skilled in the art will appreciate the form of spiral member that could be used and also the various kinds of bearing support necessary for the element 8.

Figure 17:
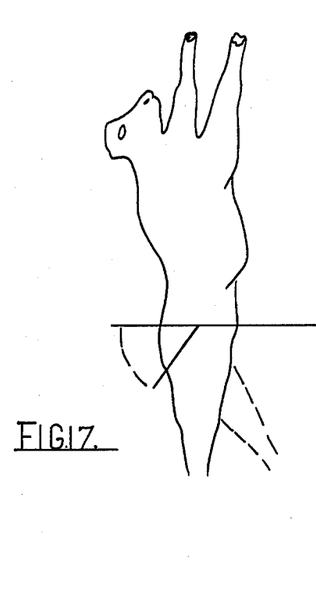
FIG. 17 shows diagrammatically for a carcass showing in the condition as shown in FIG. 7 how the ring when it reaches the level of the trunk of which the rump substantially forms part can have the rump clearing portion of the insertion device as shown in any one of FIGS. 10 to 12 actuated to pass down and substantially around the anus to clear the rump region of the carcass, FIG. 17 merely showing the arc over which the rump clearing portion of the ring will move.
Figure 18:
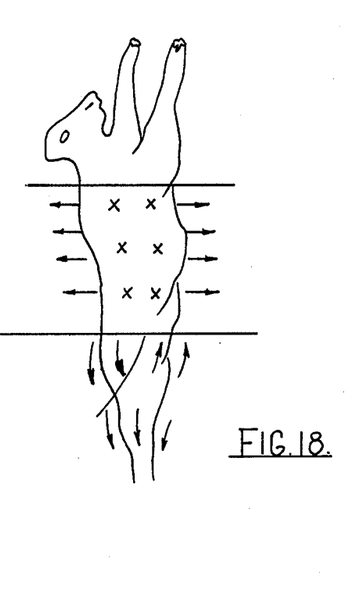
FIG. 18 shows for a carcass as shown in FIG. 17 how the use of such a rump clearing portion changes the direction of pull over the rump regions and quite importantly the lower belly region of the animal from the directions as previously described with reference to FIG. 7 which describes the use of a ring which did not include the rump clearing facility.
Figures 19, 20:
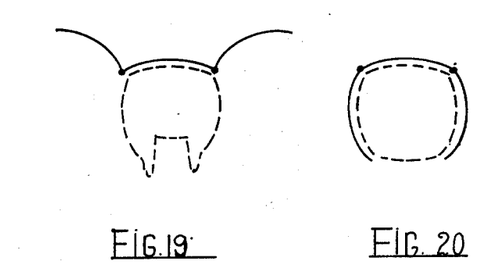
FIG. 19 is a diagramatic view showing a first means capable of substantially conforming to the girth of the trunk of the animal (shown in dotted outline) having a central arcuate portion thereof brought against and substantially around the back of the trunk of the animal.
FIG. 20 shows the apparatus in its encircling condition where it overlays the outside of the worked up pelt or just below the worked up regions.
Figure 21:
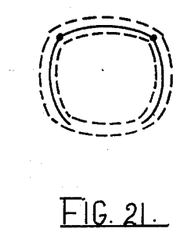
FIG. 21 shows with a dotted outline how the pelt could then be folded back down over the means encircling the girth of the animal.
Figure 22:
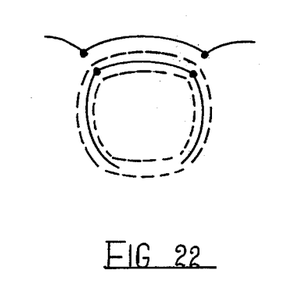
FIG. 22 shows a similar means capable of substantially conforming to the girth of the trunk of the animal being brought to clamp over the turned over flap of skin.
Figure 23:
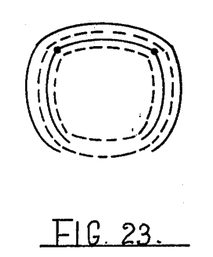
FIG. 23 shows the two means acting as two separate elements of a clamping arrangement which form a clamping arrangement of a kind that could be used on a slaughterhouse chain.

The rear portion 7 preferably includes a rump clearing portion 13 capable of being actuated eg. pneumatically to a condition from its normal insertion condition as shown in FIGS. 10 and 12 to its rump clearing condition as shown in FIG. 11 in dotted outline, the rump clearing portion 13 coming down substantially 90° and then preferably returning to about 45° for the final pull of the legs from the skin. With such an arrangement, see FIG. 17 and 18, a better clearance of the lower belly and the rump results.

In other forms of the present invention it may be appropriate to support a carcass for example by the rear legs or to support the carcass in a substantially horizontal condition, for example, if the carcass is supported by all four legs or the like or a combination of the foregoing. It should be realised however that the broad method of the present invention is not restrictive of the method of support of the carcass or the apparatus to be utilised therewith.

FIGS. 19 to 23 show diagramatically how multi part clamping portions can receive a conveyor mounted carcass with first inner ring forming member (not necessarily fully closed) when in its open condition can be positioned preferably against the back of the animal and then actuated by appropriate means to encircle the flanks of the animal. The skin would then be folded down or pulled thereover and a second preferably similar member would then be clamped thereover. Persons skilled in the art will appreciate that such a form of clamping device is just one of a multitude of similar such arrangements and of course persons skilled in the art will appreciate that it is not even necessary for the clamping to be continuous around the girth of the animal as long as the pelt or skin is clamped sufficiently to allow an even pull as the insertion device is inserted.

From the foregoing then it can be seen that the present invention provides a novel and inventive method of depelting of animals and in particular sheep (although not solely) which should find widespread acceptance and should form the basis of further development work so as provide a form of apparatus which is capable of long term high speed and hygenic operation.

1. A method of removing the pelt or skin from a carcass of an animal such as a sheep, a cattle beast, a goat, a pig or the like which comprises the steps of:
working up the carcass so that the skin or pelt is removable substantially as an envelope from regions extending substantially from brisket regions to rump regions of the carcass,
clamping with clamping means portions of the worked up skin or pelt about the trunk of the animal at about the level of the brisket region so as to hold the worked up regions of the skin or pelt away from the carcass with the inside of the skin or pelt exposed substantially in a trunk encircling manner,
freeing the skin or pelt from the carcass over its trunk from the brisket region to the rump region by causing a mechanical device to be inserted between the skin or pelt and the carcass substantially to about the rump level of the trunk, the said device substantially encircling the trunk of the carcass during such insertion,
holding said mechanical device at a position between the skin or pelt and the carcass at the region of the trunk thereof of which the rump substantially forms part and
causing a relative movement between (i) the carcass and (ii) the skin or pelt, the clamping means and said mechanical device so as to withdraw substantially all, if not all, of the rear legs of the animal from the skin or pelt.

2. A method as claimed in claim 1 wherein said mechanical device is substantially in the form of a ring.

3. A method is claimed in claim 1 wherein said mechanical device is formed from a first portion and from a second portion, said first and second portions being brought together to substantially encircle fore regions of the trunk of said carcass prior to relative movement with respect to the animal to remove the pelt or skin from the trunk regions thereof during said insertion step.

4. A method as claimed in claim 1 wherein said mechanical device includes means at or about the region thereof that is passed over the belly of the carcass adapted to minimise a build up of belly in front thereof as the mechanical device acts to remove belly regions of the skin or pelt from the carcass during said insertion step, said method including the additional step of using said means to prevent such build up during said insertion step.

5. A method as claimed in claim 1 wherein said mechanical device is halted at or just to the fore side of the level of the rump region of the trunk of the animal and means forming part of said mechanical device is actuated to continue such relative movement between the skin or pelt and the carcass over the rump region of the animal but not substantially over or between those regions of the rear legs closest to the belly of the carcass.

6. A method as claimed in claim 5 wherein said means forming part of said mechanical device is substantially over and below at least some of the rump during said causing of a relative movement between (i) the carcass and (ii) the skin or pelt, the clamping means and said mechanical device.

7. A method as claimed in claim 1 wherein said clamping is achieved by providing clamping means defining a ring about the outside of the pelt or skin to be clamped, said ring substantially encircling the trunk of said animal and holding the pelt that has been turned out over said first mentioned clamping ring.

8. A method as claimed in claim 7 wherein said holding over said first mentioned ring is by clamping with a second ring like member.

9. A method as claimed in claim 8 wherein at least one clamping ring comprises at least two arcuate members capable of being brought substantially into engagement with the carcass and thence by relative movement between said arcuate members of conforming substantially to a ring-like configuration.

10. A method as claimed in claim 9 wherein there are three arcuate portions to define a ring, the central of the three being an arcuate portion that is positioned around the back of the animal.

11. A method as claimed in claim 1 wherein said mechanical device during the course of its insertion between the skin or pelt and the carcass acts substantially solely on the skin and not the carcass during the skin or pelt removal pulling operation to thus provide a substantially perpendicular pull from the surface of the carcass of its skin or pelt over the region of the carcass from the brisket region to the rump level.

12. A method as claimed in claim 1 wherein said carcass is supported by its forelegs and its hind legs are free.

13. Apparatus disposed relative to a conveyor capable of conveying a slaughtered animal such as a sheep, cattle beast, goat, pig or the like when in a worked up condition so that the skin or pelt is removeable substantially as an envelope from regions extending substantially from brisket regions to rump regions of the carcass comprising
clamping means capable of holding worked up skin or pelt about the trunk of a conveyor supported animal at about the level of the brisket region so as to hold the worked up regions of the skin or pelt away from the carcass,
means capable of being brought to substantially encircle the trunk of said carcass and insertible between said skin or pelt when the same is clamped by said clamping means down to and around the carcass substantially to that level of the trunk of which the rump substantially forms part,
means to provide the required relative movement between said insertible means and a carcass held on said conveyor,
means to hold said insertible means about the trunk of an animal at that level of which the rump substantially forms part and
means for causing a relative movement between (i) the carcass and (ii) said skin or pelt, clamping means and said insertible means so as to enable the carcass to be withdrawn substantially completely from said skin or pelt with the rear legs or remainder thereof of the animal being pulled from the skin or pelt up throught the envelope thereof.

14. The apparatus as claimed in claim 13 wherein said insertible means comprises a plurality of ring segments capable of being brought about a conveyor supported animal and of being moved at least over the trunk regions thereof substantially in a mutually constant relationship.

15. Apparatus as claimed in claim 14 wherein there are two ring segments and each is supported by means capable of pivotting its respective ring segment into and out of said mutually constant relationship, said means being such that when said insertible means is being inserted said ring segments are in advance thereof with respect to the direction of insertion.

16. Apparatus as claimed in claim 13 wherein said clamping means comprises first means capable of substantially conforming to the girth of the trunk of the animal and second means capable of substantially conforming to the girth of the trunk of an animal substantially over said first means so as to enable the clamping of said pelt or skin therebetween.

17. Apparatus as claimed in claim 16 wherein each said means for substantially conforming to the girth of the trunk of the animal comprises a plurality of ring segments pivotally associated such that the same in one condition defines a series of open arcuate members and in another condition substantially forms a ring like member of said arcuate members capable of being disposed about the trunk of said animal.

18. Apparatus as claimed in claim 17 wherein there are three ring segments and the central of the three members is arranged to skirt the back of the animal and the other two ring segments are capable of being brought substantially about the flank of the trunk of the animal.

19. Apparatus as claimed in claim 13 wherein said insertible means includes at least for regions thereof adapted to be inserted over the belly of the animal means capable of acting on belly fat of the animal so as to minimise the stretching thereof in the insertion direction.

20. Apparatus as claimed in claim 13 wherein said insertible means includes rump clearing means capable of being actuated when said insertible means has been inserted substantially to that level of the trunk of which the rump substantially forms part of passing down and substantially around the rump of the animal but with substantially no corresponding movement on the belly side of the animal.

* * * * *

UNITED STATES PATENT AND TRADEMARK OFFICE
CERTIFICATE OF CORRECTION

PATENT NO. : 4,299,010

DATED : November 10, 1981

INVENTOR(S) : Angus A. J. Robertson, Carey J. France
and Colin A. Roberts

It is certified that error appears in the above—identified patent and that said Letters Patent is hereby corrected as shown below:

On front page format:

Paragraph [73] should be blank, as there is no assignee.

Signed and Sealed this

Twenty-ninth Day of June 1982

[SEAL]

Attest:

GERALD J. MOSSINGHOFF

Attesting Officer     Commissioner of Patents and Trademarks